Oct. 19, 1965    R. G. ERICKSON    3,212,247
SUCTION OPERATED SEED GATHERING MECHANISM
Filed July 27, 1962    2 Sheets-Sheet 1

Inventor
Ralph G. Erickson
By Marzall, Johnston, Cook & Root
Attorneys

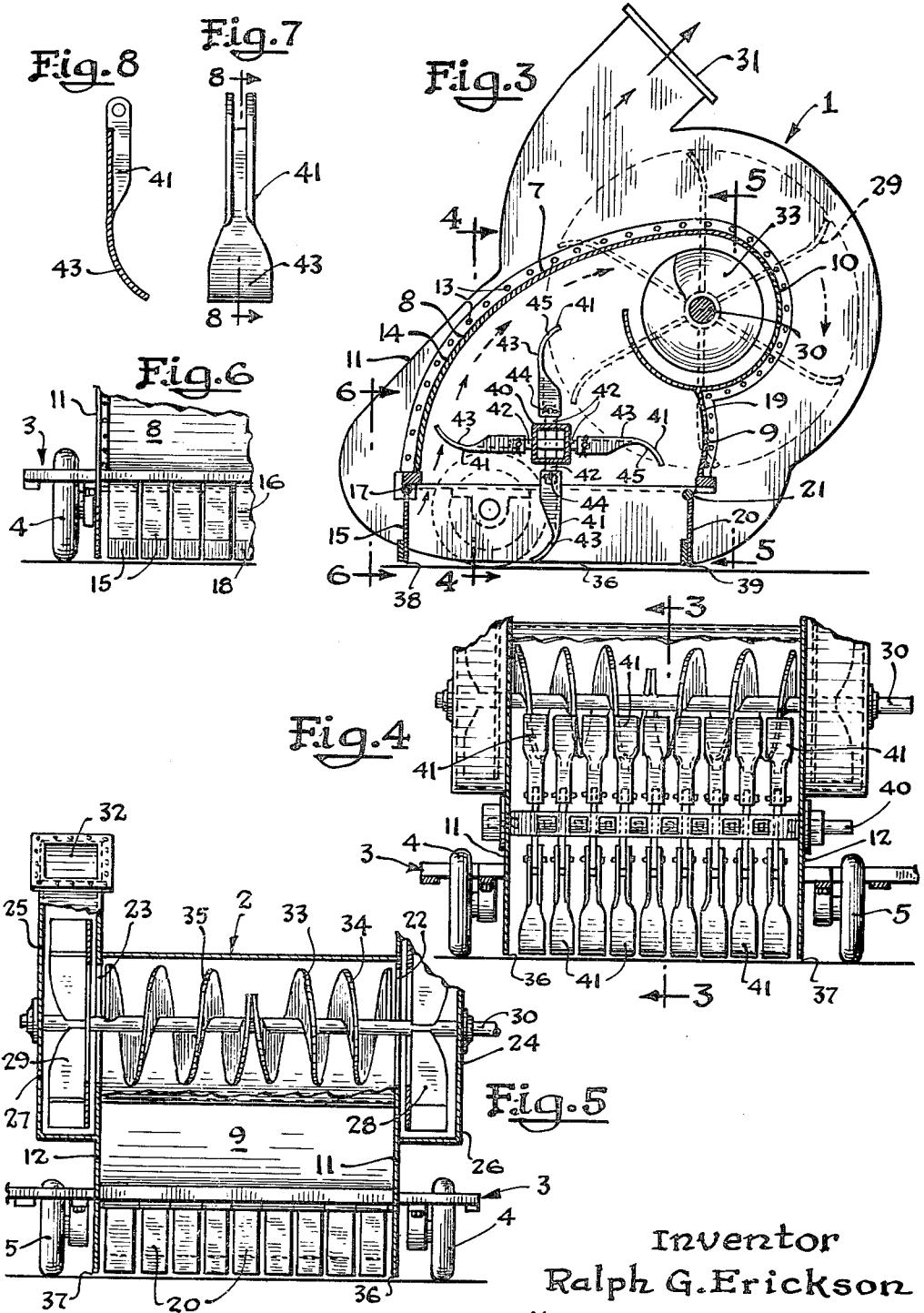

United States Patent Office 3,212,247
Patented Oct. 19, 1965

3,212,247
SUCTION OPERATED SEED GATHERING
MECHANISM
Ralph G. Erickson, Rte. 2, Box 136, Marseilles, Ill.
Filed July 27, 1962, Ser. No. 212,941
9 Claims. (Cl. 56—126)

This invention relates to gathering mechanisms and, more particularly, to machines which are particularly well adapted for gleaning grain, and the like.

It is a primary object of the present invention to afford a novel machine for gleaning fallen or downed grain, and the like.

Heretofore it has not been uncommon that in the harvesting of agricultural grain substantial portions of the grain has been knocked to the ground where it could be retrieved or gleaned only by hand. In other instances, as is known by those skilled in the art, it has not been uncommon that prior to harvesting agricultural grain, the grain has been knocked onto the ground or disposed on its stock, vine, or plane in such a position that it could not be picked or harvested by the machinery heretofore known. It is an object of the present invention to enable such grain to be harvested in a novel and expeditious manner.

Another object is to enable agricultural grain, which, from any cause, has been put on the ground or in such position that it could not be effectively picked up or harvested by heretofore known harvesting machinery, to be gleaned in a novel and expeditious manner.

A further object is to afford a novel grain gleaning machine which is efficient and practical in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 3 is a transverse sectional view through the machine shown in FIG. 1, taken substantially along the line 3—3 in FIG. 1;

FIG. 4 is a fragmentary detail sectional view taken substantially along the line 4—4 in FIG. 3;

FIG. 5 is a fragmentary detail sectional view taken substantially along the line 5—5 in FIG. 3;

FIG. 6 is a fragmentary front elevational view looking in the direction of the arrows 6—6 in FIG. 3;

FIG. 7 is a fragmentary, enlarged front elevational view of one of the blades shown in FIGS. 3 and 4; and FIG. 8 is a fragmentary detail sectional view taken substantially along the line 8—8 in FIG. 7.

Figure 1:
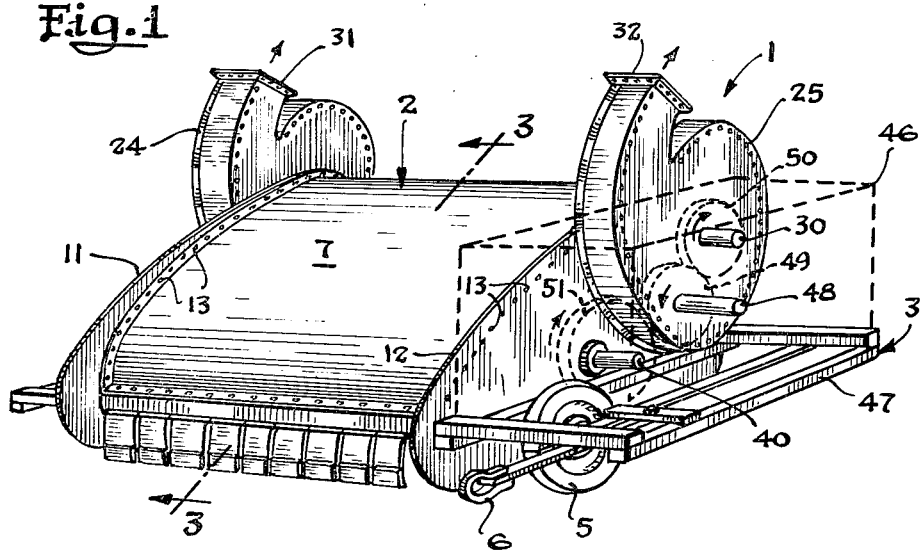
FIG. 1 is a front perspective view of a grain gleaning machine embodying the principles of the present invention.

A machine 1, embodying the principles of the present invention, is shown in the drawings to illustrate the preferred embodiment of the present invention.

The machine 1 includes a main housing 2 mounted on a frame 3, which is supported by two wheels 4 and 5, FIGS. 1, 2, 4, and 5 for transporting the housing 2 through fields to be gleaned. Suitable means such as a hitch bar 6, shown projecting forwardly from the frame 3 in FIGS. 1 and 2, may be afforded for pulling the machine 1 forwardly through such fields during the operation of the machine.

The housing 2 is open at the bottom, and includes a roof portion 7 which has an upwardly and rearwardly sloping front portion 8, and a rear portion 9, the rear portion 9 including an inwardly opening elongated concavity 10, which extends horizontally across the entire length of the upper edge portion of the rear portion 9 of the roof 7. The housing 2 also includes two substantially, parallel side walls or end plates 11 and 12, which are secured to respective opposite ends of the roof portion 7 by suitable means such as rivets 13 in position to close the respective ends of the housing 2.

As may be seen in FIGS. 1, 3, and 6, the front portion 8 of the roof 7 comprises a main body portion 14 from the lower edge of which a plurality of baffle plates or shrouding plates 15 hingedly depend for rearwardly and forwardly swinging movement in a vertical arc relative to the main body 14. The baffle plates 15 are disposed in closely adjacent relation to each other, and define the entire length of the lower edge portion of the front portion 8 of the roof 7. Each of the baffle plates 15 preferably includes an upper end portion 16, the upper end of which is pivotally mounted on a suitable rod 17, and a lower end portion 18 made of suitable flexible material such as, for example, belting, or the like, depending from the upper end portion 16.

Similarly, the rear portion 9 of the roof 7 includes a main body portion 19, from the lower edge portion of which a plurality of baffle plates or shrouding plates 20 depend for forward and swinging movement in a vertical arc, the baffle plates 20 being in identical construction to the shrouding plates 15 and being hingedly mounted on a suitable rod 21 on the lower end of the upper end portion 19. The shrouding plates 20, like the shrouding plates 15 are disposed in closely adjacent relation to each other in position to afford the entire length of the lower end portion of the rear portion of the roof 7.

The side walls 11 and 12 and the main body portions 14 and 19 of the front portion 8 and the rear portion 9, respectively, of the roof 7 may be made of any suitable imperforate material such as, for example, sheet steel, or the like.

Figure 2:
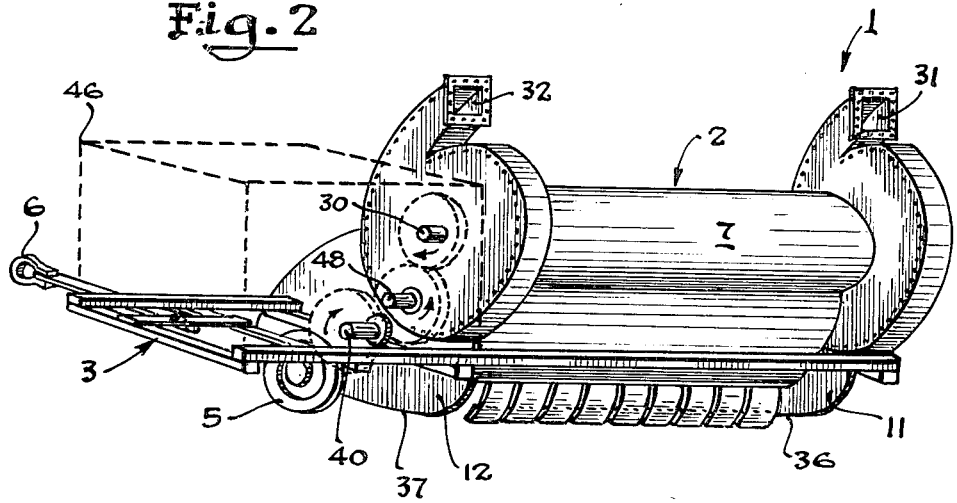
FIG. 2 is a rear perspective view of the machine shown in FIG. 1.

The side walls 11 and 12 of the housing 2 have round openings 22 and 23 extending through the upper rear portions thereof, respectively, in axial alignment with the concavity 10 in the roof 7, FIG. 5. Two blower units 24 and 25, including housings 26 and 27 having fans 28 and 29 mounted therein, respectively, FIGS. 1, 2, and 5, are mounted on the rear portions of the outer faces of the side walls 11 and 12, respectively. A drive shaft 30 extends axially through the concavity 10 in the roof 7 of the housing 2, and the opposite ends thereof are journalled in the housings 24 and 25, respectively. The openings 22 and 23 afford inlet openings for the blowers 24 and 25, respectively, and each blower unit 24 and 25 has an outlet 31 and 32, respectively, FIGS. 1, 2, and 5. The fans 28 and 29 of the blower units 24 and 25 are mounted on, and rotatable with the drive shaft 30 within the housings 26 and 27, respectively. A feed-screw or auger 33, which has opposite handed feeding blades 34 and 35 on the respective ends thereof, is mounted on the drive shaft 30 between the side walls 11 and 12 of the housing 2 in position to feed material in both directions from the longitudinal center portion of the concavity 10 in the roof 7 through the openings 22 and 23 and into the blower units 24 and 25, respectively, FIG. 5.

During operation of the novel machine 1, the fans 28 and 29 of the blower units 24 and 25, respectively, are roated by the drive shaft 30 to thereby draw air upwardly under the lower edges of the housing 2 into the concavity 10, and from the concavity 10 outwardly through the openings 22 and 23 into the blower housings 26 and 27, from which the air is discharged outwardly through the discharge outlets 31 and 32, respectively, for a purpose which will be discussed in greater detail presently.

The roof 7 and the side walls 11 and 12 of the housing 2 are disposed in such position that the lower edges 36 and 37 of the side walls 11 and 12, respectively, and the lower edges 38 and 39 of the shrouding plates 15 and 20, respectively, are disposed closely adjacent to the ground over which the machine 1 travels in a gleaning operation. Preferably, the aforementioned lower edges 36-39 of the housing 2 are disposed in such position that when the machine 1 is disposed in normal, at-rest position, without the blowers 24 and 25 operating, the aforementioned lower edges 36-39 are disposed in uniplanar relation to each other. With this construction, as the machine 1 moves through a field in a gleaning operation, or the like, with the blowers 24 and 25 operating, the combined forces exerted on the front shrouding plates 15, such as, for example, the forces exerted thereon by the movement of the air therepast into the housing 2, and the engagement of the shrouding plates 15 with irregularities in the ground and with pieces of stubble, and the like, tends to pivot the shrouding 15 rearwardly around the rod 17, to thereby dispose the lower edge 38 of the front portion 8 of the roof 7 above the other lower edges 36, 37, and 39 of the roof 7 so that a greater proportion of the air drawn into the housing 2 by the blowers 24 and 25, flows under the front edge 38 of the housing 2 than under either of the end edges 36 and 37, or the rear edge 39.

Another drive shaft 40 extends between and is journalled in the side walls 11 and 12 of the housing 2, FIGS. 1, 2, 3, and 4. The drive shaft 40 is disposed in substantially parallel relation to the drive shaft 30, in downwardly and forwardly spaced relation thereto, FIGS. 3 and 4.

A plurality of knife units or blade units 41 are mounted on the drive shaft 40 and are rotatable therewith in position to agitate or tear up the ground, and the debris lying thereon, over which the machine 1 travels in a gleaning operation. Each of the blade units 41 includes a mounting bracket 42 fixedly secured to the drive shaft 40 in substantially radially outwardly projecting relation thereto. The mounting brackets 42 are spaced from each other around the periphery of the drive shaft 40 and axially of the drive shaft 40, as shown in FIGS. 3 and 4.

Each of the blade units 41 also includes an elongated knife or blade 43 freely pivotally mounted at one end by suitable means, such as a bolt or pin 44 to a respective one of the mounting brackets 42, the pins 44 being disposed substantially parallel to the axis of rotation of the shaft 40. The other end, or the free end 45 of each blade 43 is substantially cup-shaped, the concavity thereof opening in the direction of rotation of the drive shaft 40 during operation of the machine 1.

It will be remembered that the blades 43 are freely pivotable on the brackets 42 around the pins 44, the pivotal axis thereof being disposed in parallel relation to the longitudinal axis of the drive shaft 40. Thus, it will be seen that when the drive shaft 40 is stationary, the blades 43 of the blade units 41 tend to assume a depending position relative to their respective brackets 42. However, during rotation of the drive shaft 40, the centrifugal force exerted on the blades 43 tends to cause them to project substantially radially outwardly from the drive shaft 40. In such position, the blades 43 are disposed in position to yieldingly engage the ground over which the machine 1 is moving in a gleaning operation. However, should any blade 43 engage a non-yielding obstruction, such as, for example, a rock, or the like, it is free to pivot rearwardly on its respective bracket 42 so as to prevent, or minimize damage to the blade 43.

The drive shafts 30 and 40 of the machine 1 may be driven from any suitable power source, such as, for example, from the tractor, or the like, not shown, used to pull the machine 1 through the fields in a gleaning operation. However, I prefer to drive the shafts 30 and 40 from a suitable independent power source such as, for example, a motor driven power unit 46 mounted on an extension 47 of the frame 3, as shown diagrammatically in FIGS. 1 and 2. The motor driven power unit 46 includes a drive shaft 48, which is rotatable during operation thereof. A gear 49 on the shaft 48 is operatively meshed with a gear 50 on the shaft 30, and with a gear 51 on the shaft 40, FIGS. 1 and 2. The rotation of the shaft 48 and, therefore, the gears 49-51 is such that during operation of the machine 1, both the shafts 30 and 40 rotate in a clockwise direction, as viewed in FIG. 3.

In the operation of the novel machine 1, show in the drawings, the machine 1 may be pulled forwardly by a suitable power unit, such as, for example, a tractor, or the like, connected to the hitch bar 6. As the machine 1 thus moves through a field to be gleaned, the shafts 30 and 40 are rotating in a clockwise direction, as viewed in FIG. 3. This rotation of the shaft 30 is effective to similarly rotate the fans 28 and 29 of the blower units 24 and 25 to thereby draw air upwardly under the edges 36-39 into the housing 2, and to discharge the air from the outlets 31 and 32 of the blower units 24 and 25. This rotation of the drive shaft 30 is also effective to rotate the auger 33 in a clockwise direction, as viewed in FIG. 3. The aforementioned rotation of the drive shaft 40 causes the blade units 41 to rotate around the longitudinal axis of the drive shaft 40 and tear up the ground and debris underlying the housing 2, forwardly of the auger 33 during movement of the machine 1 through the field. The rotation of the blade units 41 is effective to throw the dirt and debris dug up thereby upwardly toward the concavity 10 in the housing 2. The flow of air into the concavity 10 assists in carrying the lighter materials thus dug up by the blade units 41 into the concavity 10 and further assists the auger 33 to feed such material through the openings 22 and 23 into the blower housings 26 and 27, respectively. The material that is fed into the blower units 24 and 25 is fed outwardly thereby with the air discharged therefrom through the outlets 31 and 32, from which it may be collected in any suitable collecting means such as, for example, a suitable collecting bin or the like, not shown.

During such an operation the grain to be gleaned is picked up with the dirt and debris picked up by the blade units 41, and passes therewith into the blower units 24 and is discharged therefrom with the aforementioned air and debris. After the material, which has passed with the air through the blower units 24 and 25, has been collected in the aforementioned suitable collecting means, the grain to be salvaged may be separated from the trash or debris by any one of several suitable, well known cleaning or separating units, not shown, which are readily available on the market.

From the foregoing, it will be seen that my novel invention affords a novel machine which is highly effective to glean grain, the stalks of which have been bent down to such a level that harvesting machines, and the like, heretofore known in the art are ineffective to efficiently harvest the same.

Also, it will be noted that my novel invention affords a novel machine 1 which is even effective to efficiently glean kernels of grain which have separated from their stalks and are lying on the ground.

In addition, it will be seen that I have afforded a novel gleaning machine which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. A machine for gleaning grain from level ground in fields comprising
   (a) a housing,
   (b) means, including supporting means for said housing engageable with such level ground, for moving said housing across said level ground in a gleaning operation,
   (c) said housing
      (1) being open at the bottom, and
      (2) having front, rear and oppositely disposed side bottom edge portions disposed in such position relative to said supporting means as to be supported thereby closely adjacent said level ground during such movement of said housing across said ground,
   (d) blower means on said housing for drawing air into said housing from under said bottom edge portions and discharging said air from another portion of said housing, and
   (e) means for feeding grain from said ground to said blower means for discharge with said air from said housing,
   (f) said means for feeding grain including agitator means for agitating said ground during movement of said housing thereover and throwing said grain into said air flowing through said housing during said movement of said housing,
   (g) said agitator means including
      (1) a plurality of rotatable blades disposed in said housing in such position relative to said bottom edge portions and said supporting means as to agitatingly engage said level ground during such movement of said housing across said ground; and
      (2) means for rotating said blades.

2. A machine as defined in claim 1, and in which
   (a) said agitator means includes drive means, including a drive shaft extending across said housing and rotatable during said movement of said housing, and
   (b) said rotatable blades comprise elongated members projecting outwardly from said drive shaft for rotation thereby.

3. A machine as defined in claim 2, and in which
   (a) said agitator means includes brackets mounted on and projecting substantially radially outwardly from said drive shaft in spaced relation to each other,
   (b) said rotatable blades are freely pivotally mounted on respective ones of said brackets for rotation with said drive shaft,
   (c) each of said blades has a cup-shaped free end portion which is concave in the direction of rotation thereof, and
   (d) said free end portions are yieldably engageable with said ground under said housing during rotation of said blades with said shaft.

4. A machine as defined in claim 1, and in which said front bottom edge portion is disposed in position to be spaced from said ground a greater distance than the other of said other bottom edge portions during said movement of said housing through such a field.

5. A machine as defined in claim 1, and in which said front and rear bottom edge portions comprise depending baffle plates pivotally supported from their tops for horizontally swinging movement during said movement of said housing.

6. A machine as defined in claim 1, and in which said means for feeding grain includes auger means disposed in position in said housing to feed said grain thrown into said air by said agitator means into said blower means.

7. A machine as defined in claim 1, and in which said means for feeding grain includes conveyor means disposed in said housing above said bottom edge portions and rearwardly of said rotatable blades in position to receive said grain thrown into said air by said agitator means and feed said last-mentioned grain into said blower means.

8. A machine as defined in claim 7, and in which
   (a) said blower means includes two blowers mounted on respective sides of said housing, and
   (b) said conveyor means includes a feed-screw having two opposite-hand blades extending from the center thereof to respective ones of said blowers for feeding said grain to both of said blowers.

9. A machine for gleaning grain from substantially smooth ground in fields comprising
   (a) a housing,
   (b) means, including supporting means for said housing engageable with said ground, for moving said housing across said ground in a gleaning operation,
   (c) said housing
      (1) being open at the bottom, and
      (2) having front, rear and oppositely disposed side bottom edge portions disposed in such position relative to said supporting means as to be supported thereby closely adjacent said ground during such movement of said housing across said ground,
   (d) blower means on said housing for drawing air into said housing from under said bottom edge portions and discharging said air from another portion of said housing, and
   (e) means for feeding grain from said ground to said blower means for discharging with said air from said housing,
   (f) said means for feeding grain including agitator means for agitating said ground and the air immediately thereabove during movement of said housing thereover and throwing said grain into said air flowing through said housing during said movement of said housing,
   (g) said agitator means including
      (1) a plurality of rotatable blades having outer ends and disposed in said housing in such position relative to said bottom edge portions and said supporting means that, during rotation of said blades, said outer ends pass contiguous to the ground in a path effective to agitate the surface of the ground, and
      (2) means for so rotating said blades.

References Cited by the Examiner
UNITED STATES PATENTS

| | | | |
|---|---|---|---|
| 1,206,409 | 11/16 | Bruce | 56—19 |
| 2,513,466 | 7/50 | Fleming | 56—19 |
| 2,627,713 | 2/53 | Manning | 56—19 |
| 2,871,643 | 2/59 | McClellan | 56—24 |
| 2,938,326 | 5/60 | Lundell | 56—24 X |
| 2,990,019 | 6/61 | Finn | 56—24 X |
| 3,027,701 | 4/62 | Campbell | 56—24 |

FOREIGN PATENTS 133,119    8/29    Switzerland.

ANTONIO F. GUIDA, *Acting Primary Examiner.*

CARL W. ROBINSON, ARNOLD RUEGG, T. GRAHAM CRAVER, *Examiners.*

UNITED STATES PATENT OFFICE
CERTIFICATE OF CORRECTION

Patent No. 3,212,247　　　　　　　　　　　　October 19, 1965

Ralph G. Erickson

It is hereby certified that error appears in the above numbered patent requiring correction and that the said Letters Patent should read as corrected below.

Column 1, line 21, for "plane" read -- plant --; column 2, line 54, for "convacity" read -- concavity --; line 72, for "roated" read -- rotated --.

Signed and sealed this 27th day of December 1966.

(SEAL)
Attest:

ERNEST W. SWIDER　　　　　　　　　　　　EDWARD J. BRENNER
Attesting Officer　　　　　　　　　　　　　Commissioner of Patents